(12) United States Patent
Paunikar et al.

(10) Patent No.: US 7,752,334 B2
(45) Date of Patent: Jul. 6, 2010

(54) INTELLIGENT NETWORK ADDRESS TRANSLATOR AND METHODS FOR NETWORK ADDRESS TRANSLATION

(75) Inventors: Amit Paunikar, Los Angeles, CA (US); Bikramjit Singh, Los Angeles, CA (US)

(73) Assignee: Nomadix, Inc., Agoura Hills, CA (US)

( * ) Notice: Subject to any disclaimer, the term of this patent is extended or adjusted under 35 U.S.C. 154(b) by 2002 days.

(21) Appl. No.: 10/271,640

(22) Filed: Oct. 15, 2002

(65) Prior Publication Data

US 2004/0073704 A1    Apr. 15, 2004

(51) Int. Cl.
*G06F 15/16* (2006.01)
(52) U.S. Cl. .................. 709/245; 709/238; 709/227; 370/352; 370/401
(58) Field of Classification Search .......... 709/245, 709/238, 227, 229; 370/352, 392, 401
See application file for complete search history.

(56) References Cited

U.S. PATENT DOCUMENTS

| | | | |
|---|---|---|---|
| 5,185,860 A | | 2/1993 | Wu |
| 5,293,488 A | | 3/1994 | Riley |
| 5,678,041 A | | 10/1997 | Baker |
| 5,699,520 A | | 12/1997 | Hodgson |
| 5,793,763 A | * | 8/1998 | Mayes et al. ............... 370/389 |
| 5,835,061 A | | 11/1998 | Stewart |
| 5,940,394 A | | 8/1999 | Killian |
| 5,969,678 A | | 10/1999 | Stewart |
| 6,064,674 A | | 5/2000 | Doidge et al. |
| 6,115,545 A | | 9/2000 | Mellquist |
| 6,128,664 A | * | 10/2000 | Yanagidate et al. ......... 709/228 |
| 6,130,892 A | | 10/2000 | Short et al. |
| 6,141,690 A | | 10/2000 | Weiman |
| 6,173,322 B1 | | 1/2001 | Hu |

(Continued)

FOREIGN PATENT DOCUMENTS

JP    10-105516 A    4/1998

(Continued)

OTHER PUBLICATIONS

P. Srisuresh, K. Egevang; *Traditional IP Network Address Translator (Traditional NAT)*; Jan. 2001; 16 pages; The Internet Society; XP-002227044.

(Continued)

*Primary Examiner*—Lashonda T Jacobs
(74) *Attorney, Agent, or Firm*—Knobbe, Martens, Olson & Bear, LLP

(57) ABSTRACT

An intelligent network address translation system and methods for intelligent network address translation. The invention analyzes all data packets being communicated between the private address realm and the public address realm and performs a predefined mode of network address translation based on the packet type. By analyzing every packet that the network encounters and adjusting the network address translation mode based on the packet type, the system and method of the present invention is able to adjust the mode of network address translation dynamically during a network user's ongoing network session. Additionally, by basing which mode of translation will be employed based on packet type the translation method of the present invention insures that IP addresses are distributed efficiently and distribution of the amount of addresses is minimized.

15 Claims, 4 Drawing Sheets

U.S. PATENT DOCUMENTS

| | | | |
|---|---|---|---|
| 6,240,533 B1 | 5/2001 | Slemmer | |
| 6,256,307 B1 | 7/2001 | Salmonson | |
| 6,259,405 B1 | 7/2001 | Stewart | |
| 6,326,918 B1 | 12/2001 | Stewart | |
| 6,353,614 B1 * | 3/2002 | Borella et al. | 370/389 |
| 6,414,635 B1 | 7/2002 | Stewart et al. | |
| 6,452,498 B2 | 9/2002 | Stewart | |
| 6,453,353 B1 | 9/2002 | Win | |
| 6,470,027 B1 | 10/2002 | Birrell | |
| 6,470,386 B1 | 10/2002 | Combar | |
| 6,567,405 B1 * | 5/2003 | Borella et al. | 370/389 |
| 6,571,221 B1 | 5/2003 | Stewart | |
| 6,574,664 B1 | 6/2003 | Liu | |
| 6,584,505 B1 | 6/2003 | Howard | |
| 6,636,894 B1 | 10/2003 | Short et al. | |
| 6,697,018 B2 | 2/2004 | Stewart | |
| 6,732,176 B1 | 5/2004 | Stewart | |
| 6,738,382 B1 | 5/2004 | West | |
| 6,751,677 B1 | 6/2004 | Ilnicki | |
| 6,759,960 B2 | 7/2004 | Stewart | |
| 6,760,416 B1 | 7/2004 | Zimmerman | |
| 6,779,035 B1 * | 8/2004 | Gbadegesin | 709/228 |
| 6,823,059 B2 | 11/2004 | Kalmanek | |
| 6,829,239 B1 * | 12/2004 | Bhatia et al. | 370/392 |
| 6,834,341 B1 | 12/2004 | Bahl | |
| 6,856,800 B1 | 2/2005 | Henry et al. | |
| 6,857,009 B1 | 2/2005 | Ferreria et al. | |
| 6,868,399 B1 | 3/2005 | Short et al. | |
| 6,934,754 B2 | 8/2005 | West et al. | |
| 6,970,927 B1 | 11/2005 | Stewart | |
| 6,985,479 B2 * | 1/2006 | Leung et al. | 370/352 |
| 6,993,595 B1 * | 1/2006 | Luptowski et al. | 709/245 |
| 6,996,073 B2 | 2/2006 | West | |
| 7,003,578 B2 | 2/2006 | Kanada et al. | |
| 7,007,080 B2 | 2/2006 | Wilson | |
| 7,009,556 B2 | 3/2006 | Stewart | |
| 7,016,960 B2 | 3/2006 | Howard | |
| 7,032,243 B2 | 4/2006 | Leerssen et al. | |
| 7,058,594 B2 | 6/2006 | Stewart | |
| 7,072,056 B1 | 7/2006 | Greaves et al. | |
| 7,088,727 B1 | 8/2006 | Short et al. | |
| 7,120,678 B2 | 10/2006 | Greuel | |
| 7,126,915 B1 | 10/2006 | Lu | |
| 7,240,106 B2 | 7/2007 | Cochran et al. | |
| 7,269,653 B2 | 9/2007 | Mentze et al. | |
| 7,283,542 B2 * | 10/2007 | Mitchell | 370/401 |
| 7,333,500 B2 * | 2/2008 | Roshko | 370/401 |
| 7,349,982 B2 | 3/2008 | Hannum et al. | |
| 7,356,841 B2 | 4/2008 | Wilson et al. | |
| 7,376,113 B2 | 5/2008 | Taylor et al. | |
| 7,428,413 B2 | 9/2008 | Fink | |
| 7,472,191 B2 | 12/2008 | Stewart | |
| 7,474,617 B2 | 1/2009 | Molen et al. | |
| 7,526,538 B2 | 4/2009 | Wilson | |
| 7,539,291 B2 * | 5/2009 | D'Angelo et al. | 379/88.17 |
| 7,580,376 B2 | 8/2009 | West | |
| 2002/0116502 A1 * | 8/2002 | Iyer et al. | 709/227 |
| 2002/0116523 A1 * | 8/2002 | Warrier et al. | 709/238 |

FOREIGN PATENT DOCUMENTS

| | | |
|---|---|---|
| JP | 11-282804 A | 10/1999 |
| WO | WO 99/55056 A1 | 10/1999 |
| WO | WO 02/067531 A1 | 8/2002 |

OTHER PUBLICATIONS

Matt Smith, Ray Hunt; *Network Security Using NAT and NAPT*; Aug. 2002; pp. 355-360; $10^{th}$ IEEE International Conference; XP-002246149.

*Plaintiff Nomadix, Inc.'s Proposed Claim Construction Statement; Nomadix, Inc. vs. Second Rule LLC*; Civil Action CV-Jul. 1946, USDC, CD CA.; May 23, 2008; 183 pages.

*Second Rule LLC's Response to Nomadix, Inc.'s Proposed Claim Construction Statement; Nomadix, Inc. vs. Second Rule LLC*.; Civil Action CV-Jul. 1946, USDC, CD CA. ; Jun. 6, 2008; 74 pages.

Complaint filed Jan. 19, 2010, *Nomadix, Inc. v. SolutionInc Technologies Ltd.*, No. CV10-0381 (C.D. Cal. 2010).

Complaint filed Nov. 17, 2009, *Nomadix, Inc. v. Hewlett-Packard Co.*, No. CV09-8441 (C.D. Cal. 2009).

Maruyama et al, "A secure LAN sockets system for everyone which need not modify existing DHCP clients", Study Report of Information Processing Society of Japan, Jul. 16, 1999, vol. 99, No. 56, pp. 131-136.

Complaint for Patent Infringement of U.S. Patent Nos. 6,130,892; 7,088,727;, 6,636,894; 6,857,009 and 6,868,399.

*[Proposed] Joint Claim Construction Statement, Nomadix, Inc. vs. Second Rule LLC*; Civil Action CV-Jul. 1946, USDC, CD CA.; Jul. 2, 2008; 105 pages.

\* cited by examiner

INTELLIGENT NETWORK ADDRESS TRANSLATOR AND METHODS FOR NETWORK ADDRESS TRANSLATION

FIELD OF THE INVENTION

The present invention relates generally to communication networks. More particularly, the present invention provides for a network address translator that analyzes each data packet according to data packet type (i.e., protocol and destination address) to determine a mode of network address translation.

BACKGROUND OF THE INVENTION

Network Address Translation (NAT) is a term used to describe the method by which Internet Protocol addresses (IP addresses) used within one network are mapped (i.e., translated) to a different IP address known within another network, in an attempt to provide transparent routing to host computers. One network is designated the inside network and the other is the outside. Typically, a company maps its local inside network addresses to one or more global outside IP addresses and un-maps the global IP addresses on incoming packets back into local IP addresses. This helps ensure security since each outgoing or incoming request must go through a translation process that also offers the opportunity to qualify or authenticate the request or match it to a previous request. NAT also conserves on the number of global IP addresses that a company needs and it lets the company use a single IP address in its communication with the world.

Network Address Translation allows a single device, such as a gateway device or router, to act as an agent between the Internet (or "public network") and a local (or "private") network. This means that only a single, unique IP address is required to represent an entire group of hosts. The impetus towards increasing use of NAT comes from a number of factors including, a world shortage of IP addresses, security needs and ease and flexibility of network administration.

Traditionally NAT has two modes of operation—basic NAT and Network Address Port Translation (NAPT).

Basic NAT provides for a group of public host IP addresses to be assigned to a NAT gateway device. In implementation, basic NAT operates by providing for one to one mapping of private addresses to public addresses. This one to one mapping can either be done statically or dynamically. In static NAT, an unregistered IP address is mapped to a registered IP address on a one-to-one basis (i.e., the IP address of the host is always translated to the same address). In dynamic NAT, an unregistered IP address is mapped to a registered IP address from a group of registered IP addresses (i.e., the IP address of the host is translated to the first available address).

In contrast to basic NAT, NAPT maps all addresses in the private realm to a single public domain address. NAPT distinguishes network sessions coming from the same or different private IP addresses by mapping the private source IP address and the private source port to a unique public source port. In this regard, the data packets are translated on the basis of the unique public source port using a single public IP address. NAPT allows for mapping multiple private addresses to one public address by associating each host with a port (i.e., source IP and source port to source port mapping).

These two modes of operation, basic NAT and NAPT, both provide benefits to the network provider and/or network user. Basic NAT allows for one-to-one mapping/translation exists between the private address and the public address. However, basic NAT requires that a sizable pool of addresses be available for one-to-one mapping and, as such, basic NAT inherently has a poor IP address reusability factor. In this regard, basic NAT is only capable of supporting as many Virtual Private Network (VPN) connections as the number of public IP addresses available in the pool at any point in time.

NAPT, which provides mapping all addresses in the private realm to a single public domain address, does not require the same magnitude of available public addresses. However, in the NAPT environment the need for less public addresses is offset by a system that offers limited functionality for certain protocols and applications, such as VPN.

Recent network advancements have attempted to provide the capability to implement both basic NAT and NAPT in one comprehensive network system. For example, U.S. Pat. No. 6,058,431, entitled "System and Method for Network Address Translation as an External Service in the Access Server of a Service Provider", issued in the name of inventors Srisuresh et al., on May 2, 2000. The Srisuresh '431 patent describes an external network address translation service, which performs NAT and NAPT, concurrently. Essentially, this service is intended to reduce the cost of stub routers by removing the need for network address translation features in stub routers. In the Srisuresh '431 patent the basis of choosing NAT versus NAPT is the service agreed upon with the stub networks. This decision is made at the inception of the network connection and is fixed throughout the network session. Thus, the Srisuresh '431 patent does not teach a NAT versus NAPT decision process that is adaptable throughout the network session to accommodate the type of service desired by the network user.

Additionally, United States patent application publication number US 2002/0010799, entitled "Communication Data Relay System and Method of Controlling Connectability Between Domains" by Kubota et al., published on Jan. 24, 2002 describes a relay system between two private local area networks. The teaching pertains to connectivity between different routing domains that might be implementing different routing protocols and/or routing data. The relay system requires address translation between the two LANs and similar address translation with the Internet. The publication teaches that the relay may perform basic NAT and NAPT, or IP masquerading, depending upon the address translation module, algorithm, and lookup-table configured for each LAN. However, the Kubuto publication does not teach an address translation process that chooses a mode of translation to efficiently or effectively allocate network addresses.

In the same regard, United States patent application publication number 2002/0087721, entitled "Duplicate Private Address Translating System and Duplicate Address Network System", in the name of inventors Sato et al., published on Jul. 4, 2002 describes a duplicate network address translating device which provides translation between private addresses on independent private networks and a global address on the Internet. The device allows separate private networks to maintain duplicate IP addresses by using different protocols or by adding additional independent network address information. The disclosure teaches that basic network address translation (basic NAT) would be unable to communicate between private networks using duplicate identical IP addresses on each of the independent networks. However, the duplicate network address translating system described would perform network address translation (NAT) or network address port translation (NAPT) between the private networks and the Internet via a global address. The teaching relies on Virtual Local Area network (VLAN) tags and Multi-Protocol Label Switching (MPLS) in combination with the source IP and source port to construct a translation table.

Thus, a need remains unfulfilled for an intelligent network address translator capable of improved connectivity, security, and flexible private network administration.

SUMMARY OF THE INVENTION

The present invention provides for an intelligent network address translation system and methods for intelligent network address translation. The invention analyzes all data packets being communicated between the private address realm and the public address realm and performs a predefined mode of network address translation based on the packet type. By analyzing every packet that the network encounters and adjusting the network address translation mode based on the packet type, the system and method of the present invention is able to adjust the mode of network address translation dynamically during a network user's ongoing network session. Additionally, by basing which mode of translation will be employed based on packet type the translation method of the present invention insures that IP addresses are distributed efficiently and distribution of the amount of addresses is minimized. The system and methods of the present invention can accomplish this task without limiting the level of security provided by the translation process.

In addition, the intelligent network address translation system of the present invention provides for a heightened IP address reusability factor. This is apparent because the system provides for different hosts connecting to different network destinations to use the same public IP address, concurrently. The system maps assigned public IP addresses to destination addresses and only denies re-using the same public IP address if subsequent network users are connecting to the same destination address. Another advantage of the present invention is that translation address allocation does not depend on the order in which a network host accesses the system and the order of entry does not determine if a network host is capable of creating a Virtual Private Network (VPN) connection. In a basic NAT type system the amount of IP addresses in the public IP pool will dictate how many network users can be assigned a NAT address. For example, if the public IP pool consists of 100 IP addresses, the first 100 network users that access the system and warrant a network address translation will be assigned the addressed. As such, the 101st user will be denied network address translation. In the present invention, two factors prevent the system denying network address translation based on the order in which a network user accesses the system. First, network users that access the system may not require a unique address from the public IP pool (i.e., they may only require assignment of the default IP address). Second, in those instances in which a unique IP address is required, IP addresses can be re-used as long as the network user is attempting to access a different destination address than a previously connected network user.

In one embodiment of the invention, a method for network address translation in a communication network includes the steps of determining a data packet type for a data packet being communicated from private hosts to public network services, determining if the data packet type requires assigning an IP address from available public IP addresses and assigning the data packet an IP address from the available public IP addresses if a determination is made that the packet type requires such. Lastly the method includes, translating the address of the data packet to the assigned IP address.

The method described above may further include the step of assigning the data packet a default public IP address and a source port if a determination is made that the data packet type does not require assigning an IP address from available public IP addresses. The method may also include the steps of storing the assigned IP address in an address binding (i.e., correlation) table that maps the assigned IP address to a data packet destination address and/or the step of storing the assigned IP address in a correlation table that maps the assigned IP address to the private IP address. The storage steps allow for outgoing data packets to be checked for previous network address translation processing, thus hastening data transmission and provides for an effective IP address reusability factor.

In an alternate embodiment of the invention, a method for network address translation in a communications network is defined as, the method including the steps of analyzing each outgoing data packets to determine data packet type, determining, from multiple modes of network address translation, a mode of network address translation for each outgoing data packets based upon the determined data packet type of each outgoing data packet and performing network address translation on outgoing data packets based on the determined mode of network translation. The method allows for the modes of network address translation to include the basic NAT-type translation method of assigning a public IP address from a public IP address pool or the NAPT-type translation method of assigning a default public IP address and a related source port.

The invention is also defined by a network address translator system for providing network address translation in a communications network. The system includes an address selector module that analyzes the data packet type of outgoing data packets to determine a mode of network address translation and selects a translation address based on the determined mode of network address translation and a translation module in communication with the outgoing connection lookup module that performs network address translation on outgoing data packets using the selected translation address.

Additionally, the network address translator system may include an outgoing connection lookup module that communicates with a connection lookup table to determine if outgoing data packets have previously undergone network address translation and/or a connection creation routine that compiles translation information, including the assigned network address translation for outgoing data packets, and stores the compiled translation information in the connection lookup table. In order to reverse translate the incoming data packets, the system may include a connection lookup table to determine connection parameters for incoming data packets and a reverse translator module that performs reverse network address translation on incoming data packets based on the determined connection parameters in the connection lookup table.

BRIEF DESCRIPTION OF THE DRAWINGS

Figure 1:
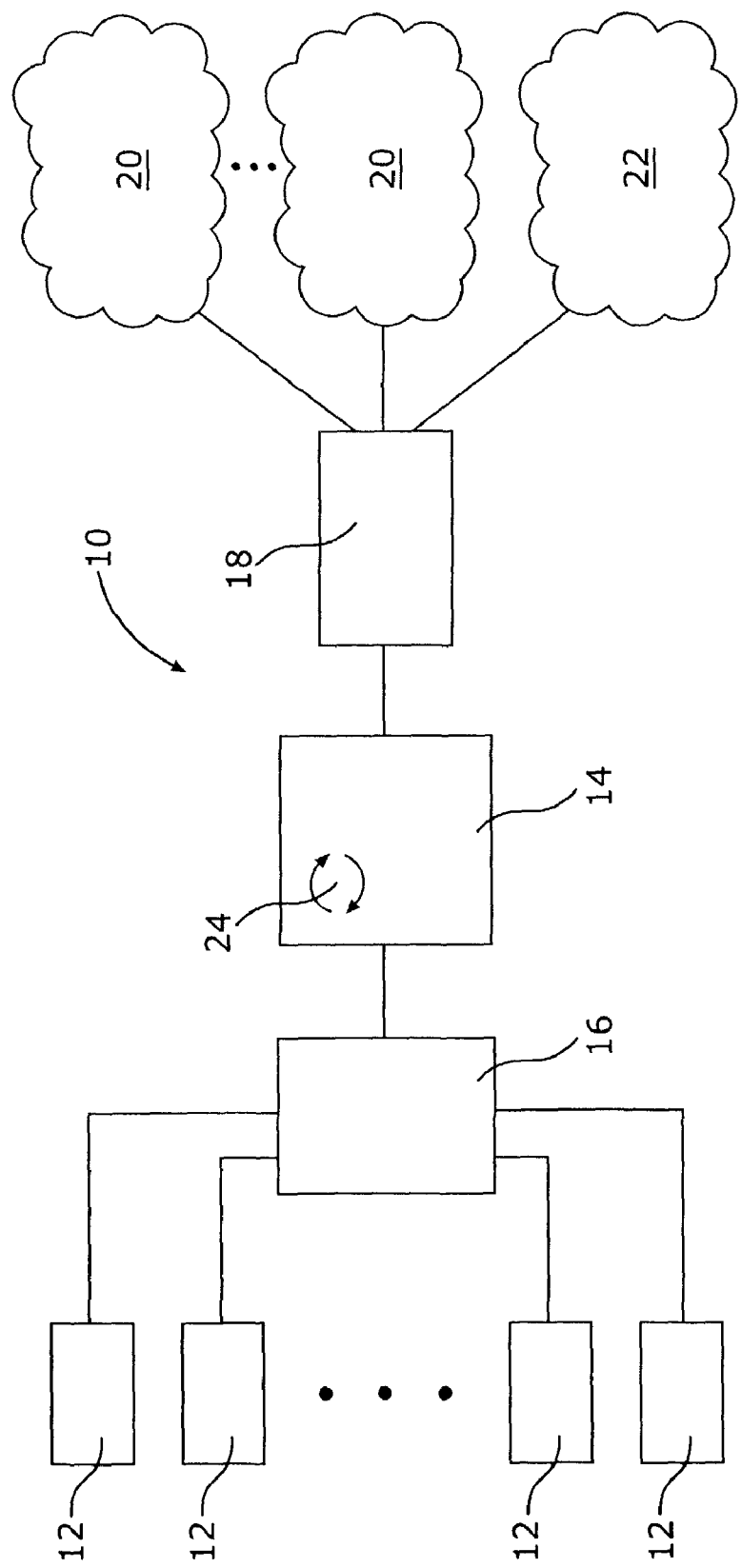

Having thus described the invention in general terms, reference will now be made to the accompanying drawings, which are not necessarily drawn to scale, and wherein:

FIG. 1 is a block diagram of a communication network implementing intelligent network address translation, in accordance with an embodiment of the present invention.

Figure 2:
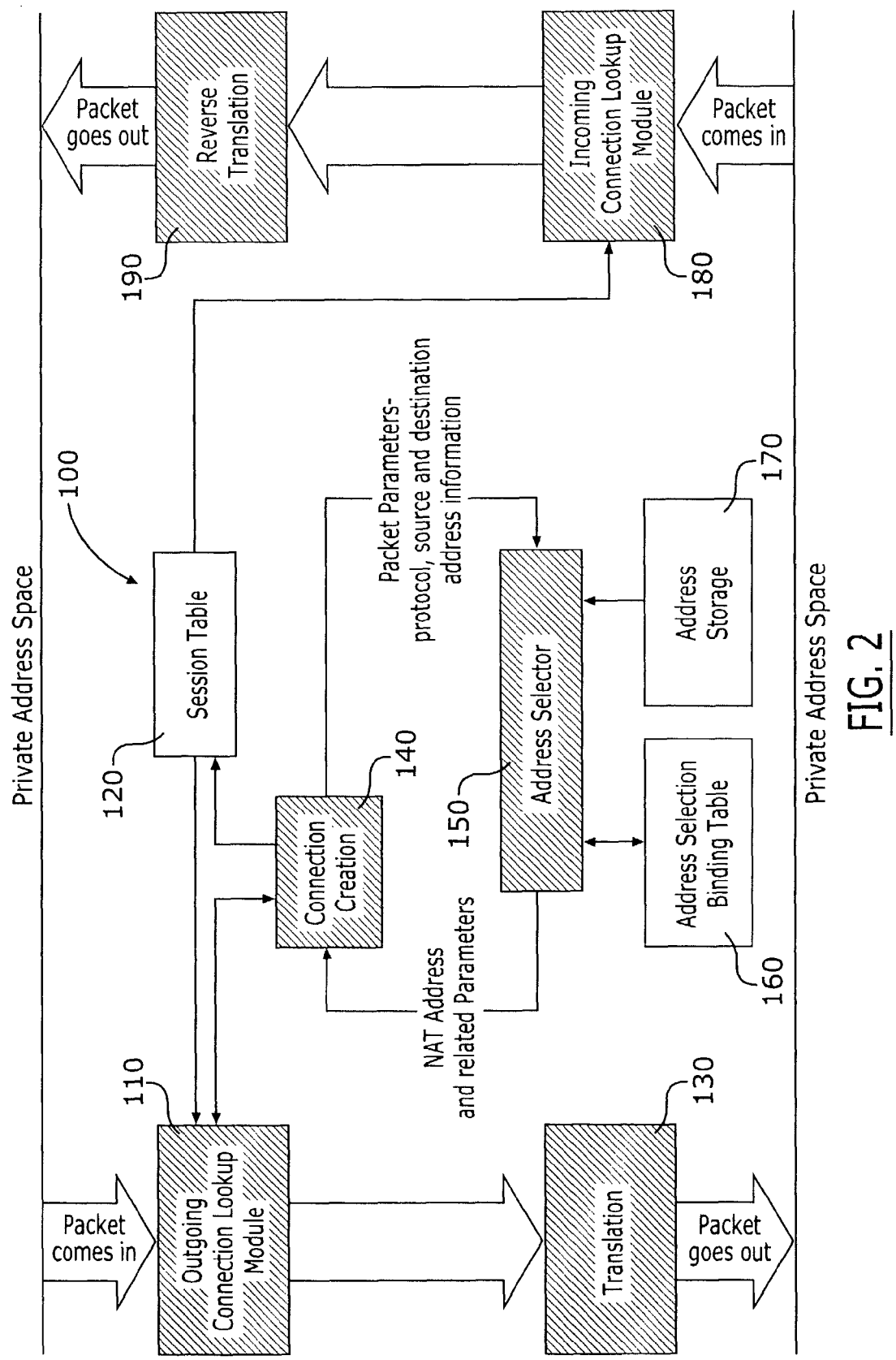

FIG. 2 is a block diagram of the system for intelligent network address translation, in accordance with an embodiment of the present invention.

Figure 3:
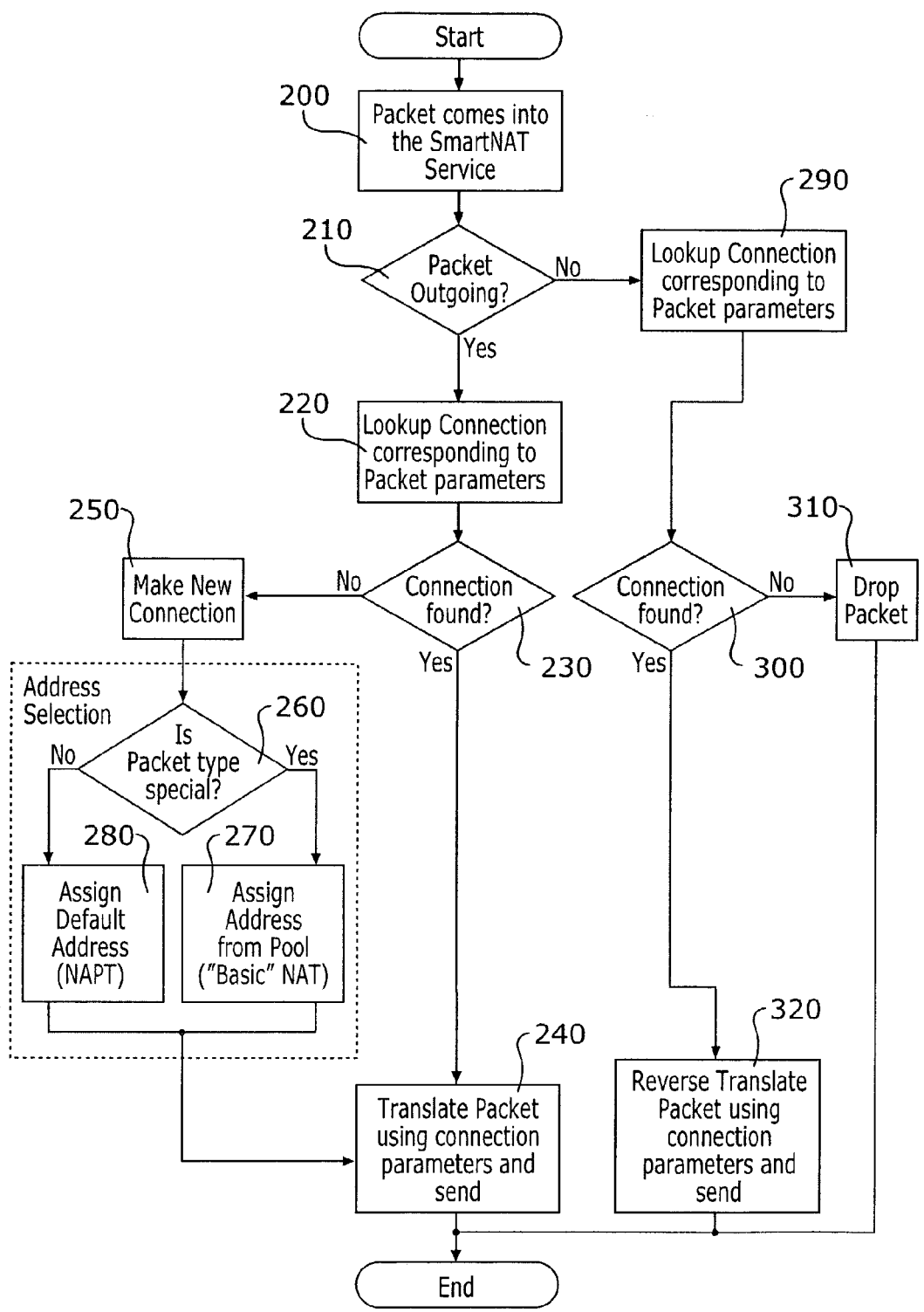

FIG. 3 is a flow diagram of a method for intelligent network address translation, in accordance with an embodiment of the present invention.

Figure 4:
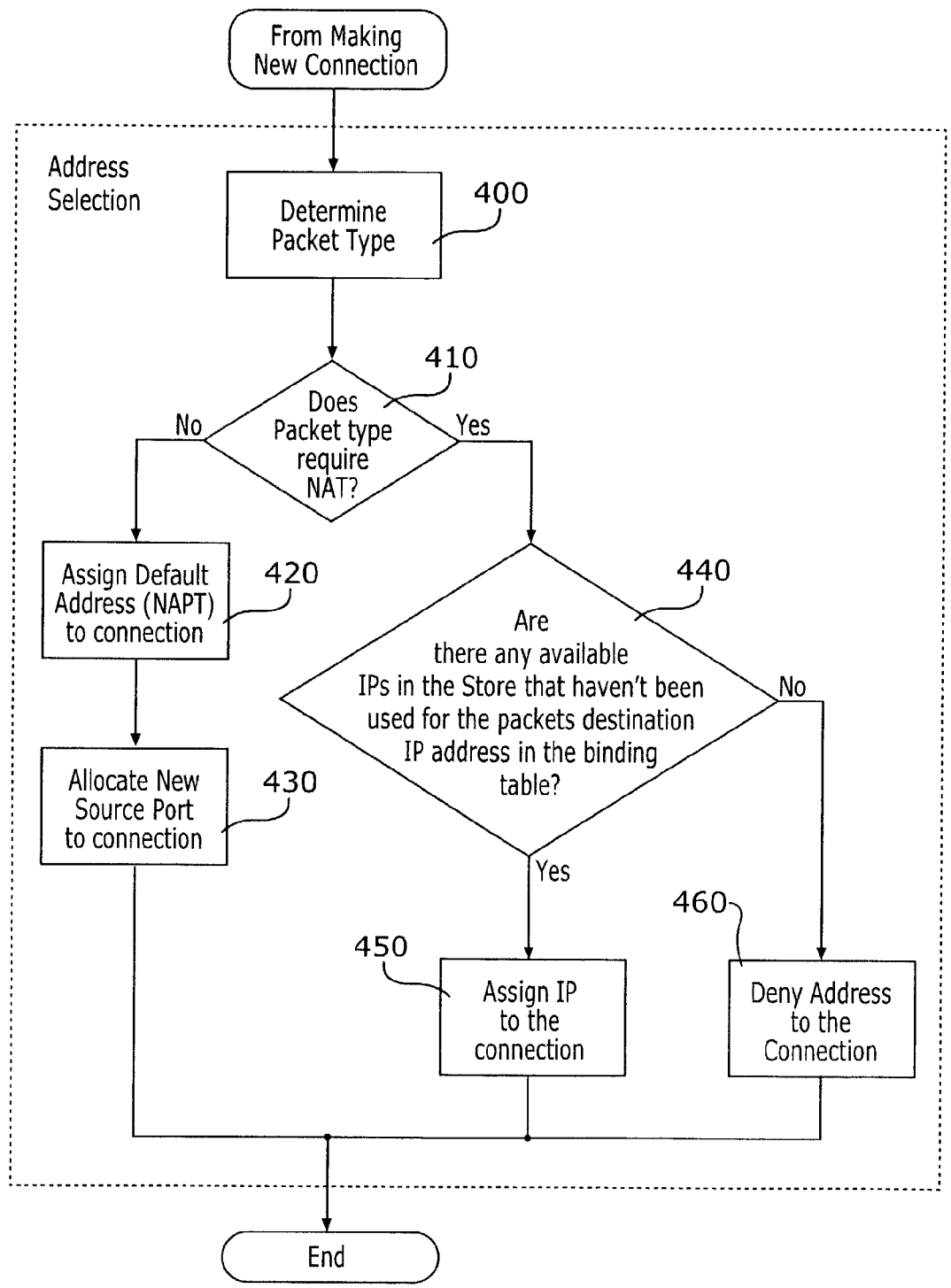

FIG. 4 is a flow diagram of the sub-method for address selection within the method for intelligent network translation, in accordance with an embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The present invention is described as an intelligent network address translator that is implemented in a communication network. The intelligent network address translator analyzes each outgoing data packet based on packet type (i.e., protocol and destination address) and decides, based on the packet type, what mode of network address translation will be applied. In one embodiment the modes of network address translation will include mapping addresses in the private realm to a single public domain Internet Protocol (IP) address and source port or assigning a public IP address from a pool of available IP addresses. In effect, the intelligent network address translator of the present invention is able to dynamically change network address translation modes during an on-going network session by recognizing changes in packet types.

For example, a network user initiates a network session from a host, begins accessing a public network, and the intelligent network translator of the present invention recognizes the packet type. Upon recognition of the packet type the translator assigns a mode of network address translation based upon the functional requirements of the protocol (i.e., the packet type). If the functionality of the protocol is not dependent on assignment of globally unique IP addresses per destination server, then the data packets will typically be mapped to a default public domain IP address and source port. If, however, later in the same network session, the network user begins accessing a private network by using a Virtual Private Network (VPN), the intelligent network address translator recognizes a change in data packet type. In this instance, if the packet type and the protocol require globally unique IP addresses to function, the data packets may be assigned a public IP address from the available pool of IP addresses. As such, the intelligent network translator of the present invention is able to more effectively assign IP addresses and limit the amount of IP addresses that are being used at any given time.

In accordance with an embodiment of the present invention, the components, process steps, and/or data structures of the intelligent network address translator are implemented using a gateway device. Different implementations may be used and may include other types of operating systems, computing platforms, computer programs, and/or general-purpose machines. In addition, those of ordinary skill in the art will readily recognize that devices of a less general purpose nature, such as hardwired devices, devices relying on FPGA (Field Programmable Gate Array) or ASIC (Application Specific Integrated Circuit) technology, or the like, may also be used without departing from the scope and spirit of the inventive concepts disclosed herewith.

FIG. 1 depicts a block diagram of a communication network 10 that implements an intelligent network translation system, in accordance with an embodiment of the present invention. The communication network typically includes a plurality of user/subscriber hosts 12 that access the communication network in order to gain access to other networks or Internet services. The communication network also includes a gateway device 14 that provides an interface between the plurality of hosts and the various networks or other online services. Most commonly, the gateway device is located proximate to the hosts at a relatively low position in the structure of the overall network. However, the gateway device can be located at a higher position in the overall network structure such as at a Point of Presence (PoP) of Network Operating Center (NOC), if so desired. Although the gateway device can be physically embodied in many different fashions, the gateway device typically includes a controller and a memory device in which software is stored that defines the operational characteristics of the gateway device. Alternatively, the gateway device can be embedded within another network device, such as the access controller or a router, or the software that defines the functioning of the gateway device can be stored on a PCMCIA card that can be inserted into the host in order to automatically reconfigure the host to communicate with a different communications network.

The communication system 10 also typically includes an access controller 16 positioned between the hosts 12 and the gateway device 14 for multiplexing the signals received from the plurality of hosts onto a to gateway device link. Depending upon the medium by which the hosts are connected to the access controller, the access controller can be configured in different manners. For example, the access controller can be a digital subscriber line access module (DSLAM) for signals transmitted via regular telephone lines, a cable modem termination system (CMTS) for signals transmitted via coaxial/optical fiber cables, a wireless access point (WAP) for signals transmitted via a wireless network, a switch or the like. As also shown in FIG. 1, the network system typically includes one or more routers 18 and/or servers (not shown in FIG. 1) in communication with a plurality of networks 20 or other Internet services 22. While the communication network is depicted to have a single router, the communication network will typically have a plurality of routers, switches, bridges, or the like that are arranged in some hierarchical fashion in order to appropriately route traffic to and from the various networks or other Internet services. In this regard, the gateway device typically establishes a link with one or more routers. The routers, in turn, establish links with the servers of other networks or other online service providers, such as Internet service providers, based upon the subscriber's selection.

In accordance with an embodiment of the present invention, the components, process steps, and/or data structures of the intelligent network address translator 24 are implemented using gateway device 14. Those skilled in the art will realize that the intelligent network address translator may be implemented in other network devices, such as traditional routers, servers or the like. In addition, the gateway device may communicate with external storage devices (not shown in FIG. 1) in order to implement the system for intelligent network address translation of the present invention.

FIG. 2 is a block diagram of the intelligent network address translation system 100, in accordance with an embodiment of the present invention. Outgoing data packets that are being transmitted from the private address space, typically a network host, to the public address space, typically a network service or the Internet, are communicated to the outgoing connection lookup module 110. The outgoing connection lookup module is in communication with the session table 120. The session table provides a log of all current network sessions/connections, the corresponding translated network address that has been assigned the current network sessions/ connection and other session/connection related data, such as source and destination addresses, session state, time outs and sequence number handling. In this regard, the outgoing connection lookup performs a routine, in conjunction with the session table, to determine if an outgoing data packet has a corresponding network address translation entry in the session table. If a corresponding entry exists in the session table, (i.e., data packets determined to be similar have already undergone intelligent network address translation) then the data packet and the network address translation information are forwarded to the translation module 130. The translation routine performs the requisite network address translation by altering address information in the header of the data packet.

The outgoing connection lookup module 110 is in communication with a connection creation routine 140. If the outgoing connection lookup module determines that no corresponding entry exists for the data packet in the session table 120 then the intelligent network address translator proceeds to the connection creation routine. The connection creation routine serves to compile the requisite connection information, including the translated network address that will subsequently be stored in the session table. The connection creation routine is in communication with the address selector module 150. The connection creation routine communicates packet parameters, such as, protocol, source address and destination address to the address selector module. The address selector module is responsible for determining the mode of network address translation that is to be implemented based on the packet type of the data packet.

The address selector module 150 is in communication with an address-selection binding table 160 and an address storage unit 170. The address selection binding maps the network address translation to the destination address and the address storage unit is the resource for all available network address translation addresses.

The address selector module 150 will analyze the data packet to determine the packet type. Packet type will be indicated by the protocols assigned to the data packet. Based on the packet type the data packet will be assigned a mode of network address translation. In one embodiment of the invention, predetermined packet types are specified as requiring assignment of a default public IP address and port (i.e., effectively performing NAPT-type network address translation) and other predetermined packet types are specified as requiring assignment of a public IP address from the pool of available IP addresses.

If the address selector module 150 determines that the packet type requires assigning a public IP address from the pool of available addresses then the address selector module will determine the data packet's destination address. The address selector module communicates with the address storage 170 to retrieve a public IP address. The destination address is then used to determine if the address-selection binding table 160 has an entry that corresponds to the destination address and the retrieved public IP address. If an entry does exist for the destination address, it means that the corresponding public IP address is being used for another session to the same destination by another network user and therefore this public IP address cannot be used for the current new data packet. In this instance, the address selector module will access the address storage for another public IP address. If no entry exists in the binding table for the destination address then the address selector module assigns the new public IP address to this destination address. Upon assignment of the new IP address, an entry is placed in the binding table to signify that the IP address corresponds to the destination address of the data packet.

The assigned public pool IP translation address and related parameters are communicated by the address selector 150 to the connection creation routine 140 at which a session/connection table entry is compiled and forwarded to the session table 120. Additionally, the translation network address and related parameters are communicated to the translation module 130 where the translation routine performs the requisite network address translation by altering address information in the header of the data packet.

If the address selector module 150 determines that the packet type requires assigning a default public IP address and a source port then the address selector module will assign the default public IP address and bind the data packet to a corresponding source port of the device that implements the intelligent network address translation.

The default public IP translation address, assigned port and related parameters are communicated by the address selector 150 to the connection creation routine 140 at which a session/ connection table entry is compiled and forwarded to the session table 120. Additionally, the translation network address and related parameters are communicated to the translation module 130 where the translation routine performs the requisite network address translation by altering address information in the header of the data packet.

Incoming data packets that are being transmitted from the address space, typically a network service or the Internet to the private address space, typically a network host are communicated to the incoming connection lookup module 180. The incoming connection lookup module is in communication with the session table 120. The session table provides a log of all current network sessions/connections and, therefore, the session table provides the correlation between the translated network address of the incoming data packet and the private address. The incoming connection lookup module is in communication with the reverse translation module 190. The incoming connection module communicates the private address and related address information to the reverse translator module and the reverse translator module reconfigures the network address in the header of the data packet such that packets that are forwarded to the private address space indicate the originally assigned private address.

It should be obvious to those of ordinary skill in the art that the modules depicted in FIG. 2 can be formed in numerous different ways, but are typically embodied by the controller operating under software control to perform the recited functions.

FIG. 3 is a flow diagram of a process for intelligent network address translation, in accordance with an embodiment of the present invention. At step 200, a data packet arrives at the intelligent network translation system and, at step 210, the system determines whether the data packet is an outgoing data packet. Outgoing data packets are data packets that emanate from a private address space, such as a network host and are to communicated to the public address space, such as a network service, the Internet or the like. Incoming data packets are data packets that emanate from the public address space and are to be communicated to the public address space. This determination is necessary because outgoing data packets will require network address translation and incoming data packets will require reverse network address translation.

If a determination is made that the data packet is an outgoing data packet then, at step 220, the system performs a lookup to determine if a connection exists in corresponding connection memory (i.e., session table). The existence of a connection means that data packets from the same private address have previously been mapped to a translated network address during the current connection and, therefore, no further analysis of the data packet is necessary prior to translation. As such, at step 230, the determination is made to assess whether a connection is found in the connection memory. If a connection is found in the connection memory then, at step 240, the process performs the translation using the connection parameters and translation network address found in the connection memory and the outgoing data packets are communicated to the public address realm.

If a connection is not found in the corresponding connection memory, then at step 250, the process determines that a new connection entry must be determined. FIG. 3 illustrates a simplified method for creating a new connection (i.e., selecting a translation network address), in accordance with an embodiment of the present invention. For a more detailed method flow for selecting an address see FIG. 4 and the discussion that ensues, infra. At step 260, the process determines whether the packet type of the data packet has been predetermined to be "special". In this instance, "special" is defined as those packet types that will require a specified mode of network translation. The network administrator is capable of predefining, and changing based on need, which data packet types will be defined as "special". Typically, packet types, which are defined by the packet protocol, will be deemed "special" if they belong to a protocol that does not function if the packets undergo port translation. In one embodiment of the invention, packet types that are determined to be "special" will be assigned, at step 270, a public IP address from the pool of available IP addresses. If the packet type is not determined to be "special", then, at step 280, a default public IP address is assigned and a source port is assigned. Once a translation address has been assigned, either from the public IP pool or the default public IP address the process performs the translation, at step 240, using the assigned translation network address and associated connection parameters and the outgoing data packets are communicated to the public address realm.

If, at step 210, the data packet is determined to not be an outgoing data it is then deemed to be an incoming data packet that emanated from the public address realm. As such, at step 290, an incoming lookup connection process is employed to determine the connection corresponding to the translated network address in the data packet. At step 300 the process determines whether an entry exists in the corresponding connection memory. If no entry is found, meaning the connection entry was never established or entered for the outgoing data packets then, at step 310, the data packet is dropped and no further communication of the data packet ensues. If an entry is found in the corresponding connection memory, then the connection parameters and the private address mapped to translation network address are used, at step 320, to reverse translate the data packet back to the original private network address and the reverse translated data packets are then communicated to the private address realm.

FIG. 4 provides a detailed method for address selection in an intelligent address translation system, in accordance with an embodiment of the present invention. FIG. 4 is a more detailed flow of the method illustrated by steps 260-280 of FIG. 3. At step 400, a packet type determination is made by analyzing the data packet and determining the packet's protocol. Once the packet type is determined then the process assesses the packet to determine the mode of network address translation that is required. The system of the present invention will predefine which protocols will dictate which mode of network translation. At step 410, the process determines if the packet type is deemed special and, thus, requires basic NAT-type network address translation (i.e., assigning a public IP address from the pool of available IP address). If, at step 420, the determination is made that the packet type is not special and, therefore, does not require basic NAT-type network address translation then the data packet is assigned the default public IP address. In association with assigning the default public IP address, at step 430, a source port is allocated to the connection.

If the data packet is determined to be "special" and, thus require basic NAT-type processing then, at step 440, a determination is made as to whether an IP address is available in the associated public IP pool and an entry corresponding to the IP address and the data packet destination address does not exist in the address binding table. If such an IP address is available, then, at step 450, the IP address that is available is assigned to the connection as the translation network address. This mapping of the assigned public IP address and the destination address is added to the address binding table. However, if a determination is made that no IP address is available then, at step 460, no network address translation can be performed on the data packet and the packet is dropped from further communication.

By providing for mapping of public pool IP addresses to destination addresses and only denying reusability of the public pool IP address if it has been mapped to the same destination address that a subsequent network user desires to access, the present invention significantly increases the IP address reusability factor. This allows more potential network users to establish NAT-type connections and significantly lessens the dependency on when a network user accesses the system to determine IP address allocation.

As such, the present invention is capable of intelligent network address translation. The intelligent aspect of the translation system is realized by analyzing different parameters of all data packets being communicated between the private address realm and the public address realm and performing a predefined mode of network address translation based on the packet type. By analyzing every packet that the network encounters and adjusting the network address translation mode based on the packet type, the system and method of the present invention is able to adjust the mode of network address translation dynamically during a network user's ongoing network session. Additionally, by basing which mode of translation will be employed based on packet type the translation method of the present invention insures that IP addresses are distributed efficiently and distribution of the amount of addresses is minimized.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A network address translator device configured to provide network address translation services in a communications network, the device comprising:
    a processor;
    a public network interface;
    an address selector module configured to be executed on the processor;

a network access translation module configured to be executed on the processor; and a network address port translation module configured to be executed on the processor;

the address selector module configured to receive an outgoing data packet from a host device, analyze the outgoing data packet to identify an attribute of the outgoing data packet indicative of whether the packet requires a dedicated IP address, and execute either the network access translation module if the packet requires a dedicated IP address or the network address port translation module if the packet does not require a dedicated IP address;

the network access translation module configured to select a dedicated public IP address from a pool of public IP addresses and transmit the outgoing data packet via the public network interface using connection parameters based on the selected dedicated public IP address; and the network address port translation module configured to select a port and transmit the network packet via the public network interface using connection parameters based on a default public IP address and the port.

2. The network address translator of claim 1, further comprising an outgoing connection lookup module that communicates with a connection lookup table to identify connection parameters associated with a destination address of the outgoing data packet.

3. The network address translator of claim 2, further comprising a connection creation routine that receives the connection parameters from the network access translation module or the network address port translation module and stores the connection parameters in association with a destination address of the outgoing data packet in the connection lookup table.

4. The network address translator of claim 2, further comprising:

an incoming connection lookup module that communicates with the connection lookup table to determine connection parameters for incoming data packets based on the source address of the incoming data packets; and a reverse translator module that performs reverse network address translation on the incoming data packets based on the determined connection parameters in the connection lookup table.

5. The network address translator of claim 1, wherein identifying an attribute of the outgoing data packet indicative of whether the packet requires a dedicated IP address comprises identifying a protocol associated with the outgoing data packet and determining whether the protocol requires a globally unique IP address to function.

6. A gateway device configured to perform network address translation services, comprising:

a processor;

a public network interface;

a packet type detection module configured to be executed on the processor;

a network access translation module configured to be executed on the processor; and a network address port translation module configured to be executed on the processor;

wherein the packet type detection module is configured to receive a network packet from a host device, identify an attribute of the network packet indicative of whether the packet requires a dedicated IP address, and execute either the network access translation module if the packet requires a dedicated IP address or the network address port translation module if the packet does not require a dedicated IP address;

wherein the network access translation module is configured to select a dedicated public IP address from a pool of public IP addresses and transmit the network packet via the public network interface using connection parameters based on the dedicated public IP address; and wherein the network address port translation module is configured to select a port and transmit the network packet via the public network interface using connection parameters based on a default public IP address and the port.

7. The gateway device of claim 6, wherein the attribute comprises a protocol associated with the network packet.

8. The gateway device of claim 6, wherein the network access translation module is further configured to determine whether the dedicated public IP address is associated with a destination address and, if so, to select a second dedicated public IP address.

9. The gateway device of claim 6, further comprising a session table and a storage routine configured to store, in the session table, information representing an association between a destination address of the network packet and the connection parameters.

10. The gateway device of claim 6, further comprising a private network interface, and wherein the network packet is received from the host device via the private network interface.

11. A method of network address translation performed at a gateway device having a default public IP address and a plurality of dedicated public IP addresses, the method comprising:

receiving, at the gateway device, a network packet from a host device communicatively connected to the gateway device;

identifying, at the gateway device, a protocol associated with the network packet;

determining, using a processor of the gateway device, whether the protocol requires a dedicated address; and transmitting the network packet from the gateway device, using communication parameters comprising either a dedicated public IP address selected from the plurality of dedicated public IP addresses if the protocol requires a dedicated address, or the default public IP address and a port number if the protocol does not require a dedicated address.

12. The method of claim 11, further comprising the step of storing, in a connection lookup table, the communication parameters in association with a destination address of the network packet.

13. The method of claim 12, further comprising the step of querying the connection lookup table for stored connection parameters corresponding to the network packet prior to determining whether the protocol requires a dedicated address.

14. The method of claim 12, further comprising:

receiving, at the gateway device, an incoming data packet;

locating stored connection parameters in the connection lookup table corresponding to the incoming data packet; and transmitting the incoming data packet from the gateway device, using the stored connection parameters.

15. The method of claim 11, wherein transmitting the network packet from the gateway device comprises altering address information in the header of the network packet.

* * * * *